3,320,178
PROCESS FOR MAKING NUCLEAR FUEL
            MATERIAL
Edgar H. Dewell, Lynchburg, Va., assignor to The Babcock & Wilcox Company, New York, N.Y., a corporation of New Jersey
No Drawing. Filed Apr. 1, 1966, Ser. No. 539,279
         13 Claims. (Cl. 252—301.1)

This invention relates generally to the production of nuclear fuel material, and more particularly to an improved process for making mixed oxide ceramic nuclear fuel material.

In copending application entitled, Process for Making Refractory Materials, filed on Apr. 1, 1966 in the name of Carroll J. Halva under Ser. No. 539,278 and assigned to the assignee of the present invention, a "gel-addition process" was disclosed for producing mixed oxide ceramic nuclear fuel materials, which process was described as an improvement over the known "sol-gel process." In the improved "gel-addition process," the fissionable material is added to the gel form of the fertile material by contacting gel particles with a fissionable material-bearing solution. By adding the fissionable material to the gel form of the fertile material rather than to the sol or colloidal form, several distinct advantages are realized, i.e. economical employment of the expensive fissionable material, minimization of criticality problems in conducting the process and potentially higher fissionable material concentration capabilities.

In contacting the gel particles with the fissionable material-bearing solution in the "gel-addition process," three variables will control the fissionable material uptake or concentration, the three variables being particle size, composition of the fissionable material-bearing solution including concentrations of both fissionable material and other components added for control of such factors as pH, and length of contact time. All three factors must necessarily be carefully controlled if the process results are to be reproducible. As discussed in the above-mentioned copending application, spheres rather than random size and shaped particles (shards) are preferred since a more uniform impregnation of spheres is likely to occur. Moreover, by size grading the gel sphere prior to contact with the fissionable material-bearing solution, an exactly defined spectrum of particle size can be selected for impregnation. Thus, the particle size is controllable. The second variable, i.e. composition of the fissionable material in the contacting solution, is determinable and may be monitored and controlled by known methods.

Initial experiments with the improved "gel-addition process" indicate that the uptake rate of the fissionable material into the gel particles is in fact quite rapid, thus necessitating precise control of the total exposure or contact time. To properly control this time period and to provide a truly standardized process and product, it is necessary to insure precise engagement of the gel particles with the fissionable material-bearing solution, precise disengagement or withdrawal of the gel from the solution, and a predetermined exposure route during the contact time interval.

To date, experiments have been directed to contacting the gel particles with the fissionable material-bearing solution in laboratory scale equipment, i.e. placing the gel spheres in a beaker of fissionable material-bearing solution and stirring the solution, or percolating the fissionable material-bearing solution over a packed column of gel particles. In the beaker experiments, the primary difficulty is in attaining precise disengagement of the gel particles from the fissionable material-bearing solution. Also since the fissionable material-bearing solution is normally an aqueous solution such as uranyl nitrate, the gel particles tend to extract water from the dilute solution and regress to the colloidal form in which they tend to adhere to each other. Furthermore, upon the regression of the gel particles to colloidal form, compounds of the fertile material tend to form in the fissionable material-bearing solution, thus necessitating the expense of replacement and possibly refinement of the solution. The packed column contact approach is also fraught with problems of particle adhesion; moreover, as the fissionable material-bearing solution passes downwardly through the packed column, the solution undergoes a considerable change in composition, both in fissionable material content and acidity, so that the upper gel particles are exposed to and absorb different amounts of fissionable material than do the lower particles, which results in nonuniformity of fissionable material concentration in the final product.

Accordingly, it is the object of the present invention to provide an improved method of contacting the fertile material gel particles and the fissionable material-bearing solution. It is a more specific object of the present invention that the herein disclosed method afford precise engaging and disengaging procedures respecting the gel particles and the fissionable material-bearing solution, as well as a predictable, controllable, and uniform contacting route so that uniformly loaded gel particles may be produced.

These objects are attained, according to the present invention in a method for producing a mixed oxide ceramic nuclear fuel material, which method begins with the preparation of spheroidal fertile material gel particles by suitably drying a colloid of the fertile material. A preselected spectrum or consist of particle sizes is passed through a fissionable material-bearing solution to directly impregnate the gel particles with the fissionable material. The thus impregnated particles are then passed from the fissionable material-bearing solution directly into a disengaging fluid to abruptly and controllably disengage the gel spheres from contact with the fissionable material. The particles are then densified by calcination to produce the dense mixed oxide ceramic form useful in the production of nuclear fuel elements by compaction.

The passage of the gel particles through the fissionable material-bearing solution and into the disengaging solution is preferably carried out without commingling of the gel particles, and is preferably effected by freefalling the gel spheres downwardly through a multi-stage liquid column containing in its upper portion the fissionable material-bearing solution, and in its lower portion the disengaging fluid, the two fluids being immiscible with each other. The disengaging fluid may be a dehydrating solvent which absorbs from the fissionable material impregnated particles any water picked up during the impregnation of the particles by an aqueous fissionable material-bearing solution. An intermediate fluid, immiscible with and separating the fissionable material-bearing solution and the dehydrating solvent, may be used to minimize extraction of water from the aqueous fissionable material-bearing solution by the dehydrating solvent. Alternatively, the interface area between the fissionable material-bearing solution and the dehydrating solvent may be minimized by restricting the cross-sectional area of the fluid column at the interface of the fissionable material-bearing solution and solvent. The process is adaptable for use with various mixed oxide ceramic fuels such as thoria/urania, urania/urania and urania/plutonia.

For a better understanding of the invention, its scope, its operating advantages, and specific objects attained by its use, reference should be had to the following description.

The present invention will be hereinafter described in terms of the production of a particular mixed oxide nuclear fuel material, i.e. thoria/urania; however, it is not thereby intended that the scope of the invention be limited to this particular nuclear fuel material. Rather it is intended that the scope of the invention cover any mixed oxide nuclear fuel material wherein the fertile material is thoria and/or urania and the fissionable material in calcined form is urania and/or plutonia. In relation to the use of urania as the fertile or fissionable material, it is recognized that urania U-238 is the form usable as fertile material, and that urania U-233 and U-235 are forms usable as the fissionable material.

The "gel-addition process" as described in the above-identified copending application and as improved according to the present invention, begins with the preparation of a thoria sol or aqueous colloid of the fertile material. The starting material is preferably crystalline thorium nitrate. This material is subjected to denitration at elevated temperatures to produce thoria powder, which is mixed with water and a suitable acid to form a sol or aqueous colloid. The thus formed sol could be dried in trays to produce thoria gel in shard form; however, since the spheroidal particle shape of the gel is preferred, droplets of the sol are passed through a drying or dehydrating solvent to produce the preferred gel spheres which are dried sufficiently so that they do not have a tendency to adhere to each other and can therefore be readily handled. From the thus produced gel spheres a consist having a predetermined size spectrum is selected for further processing, the selection being based on a statistically appropriate mixture of particle sizes for dense compaction.

The next step in the process, i.e. contacting the thoria gel spheres with a fissionable material-bearing solution, is the most crucial and the one with which the present invention is directly concerned. As discussed above, in addition to using preselected particle sizes, and preselected and controlled fissionable material concentrations, it is necessary that the time span of the contacting step, i.e. the time period between engagement and disengagement of the gel spheres with the fissionable material-bearing solution, be precisely controlled in order to obtain the specific desired fissionable material uptake by the gel particles on a reproducible basis. According to the present invention, the contacting is controlled by releasing the gel spheres to free-fall through a multi-stage fluid column wherein the upper fluid is a fissionable material-bearing solution, such as uranyl nitrate and the immediate subjacent fluid is a disengaging liquid immiscible with the uranyl nitrate. Knowing the size and weight of a given spheroidal gel particle and the density of the uranyl nitrate, and applying Stokes' law, the free-fall time of the particle through a given height of uranyl nitrate can be calculated. With this information, the height of the uranyl nitrate in the fluid column can be preset to effect the desired contact time and therefore the total uranium uptake. As the particle passes through the interface of the uranyl nitrate and the disengaging liquid, the particle is abruptly disengaged from contact with the uranyl nitrate, thus affording a precise and predictable termination of the contacting period. By this device, the step of contacting is rendered controllable and highly reproducible.

Since the particle to be impregnated with the fissionable material is in gel form, and when the fissionable material-bearing solution, e.g. uranyl nitrate, is in aqueous solution, in passing downwardly through the uranyl nitrate, the gel particle is apt to absorb water and thereby tend to regress to the colloidal form. Thus, when the uranium impregnated gel sphere emerges from the uranyl nitrate, it may have a tendency to adhere to other particles or to the equipment in which the process is being carried out. It is therefore desirable that the gel particles be passed through the aqueous uranyl nitrate solution and at least into the disengaging fluid without substantial commingling of particles. Moreover, it is highly desirable that a dehydrating solvent be disposed in the fluid column below the uranyl nitrate, which solvent could additionally serve as the disengaging fluid. For example, the liquid solvents carbon tetrachloride or trichlorethylene (both containing acetone) would be suitable dehydrating fluids, since they are immiscible with and may be constituted so as to have a higher density than uranyl nitrate. Thus, by passing individual thoria gel particles downwardly through a two-stage column containing uranyl nitrate and a subjacent body of dehydrating solvent, the gel particles would be collected at the base of the column without encountering particle adhesion problems when they are collected.

At the interface dividing the aqueous uranyl nitrate from the dehydrating solvent, there would be a tendency for the solvent to extract water from the uranyl nitrate solution. Accordingly, in order to minimize this rate of water extraction between the fluids in the column, the walls defining the column are preferably necked down at the interface to minimize the interface area.

Although no liquid having the precise required characteristics is known at this time, it is also conceivable that an intermediate liquid having a density less than the density of the fissionable material-bearing solution and being nonreactive therewith, and greater than the density of the dehydrating solvent and being nonreactive therewith, and immiscible with both could be utilized to avoid extraction of water from the aqueous, fissionable material-bearing solution by the dehydrating solvent.

Upon collection of the impregnated and dried gel particles, they are calcined to produce a highly densified nuclear fuel material suitable for compaction into desired fuel element configurations by methods known in the art.

The above description has been in terms of the production of thoria/urania fuel material using aqueous uranyl nitrate as the contacting solution. It should be recognized that other uranium compounds (e.g. uranyl fluoride, acetate, chloride, sulfate, etc.) might also be suitable as contacting solutions. Nor, as mentioned above, is the invention limited to the specific mixed oxide fuel material described. Specifically, it is further contemplated that urania/urania and urania/plutonia fuel materials could also be produced according to the herein disclosed method. It is, of course, recognized that in the production of these other fuel materials, appropriate fissionable material-bearing solutions and dehydrating solutions would have to be used, and that the material and procedures used in the sol preparation stage of the process would have to be selected and modified according to the particular product desired.

What is claimed is:

1. A process for preparing a ceramic mixed oxide nuclear fuel material comprising the steps of preparing a colloid of a fertile nuclear material, drying said colloid to form gel particles, passing said gel particles through a first fissionable material bearing fluid in liquid phase to directly impregnate said gel particles with said fissionable material, passing the thus impregnated particles from said first fluid directly into a second disengaging fluid to abruptly and controllably disengage said gel particles from contact with said fissionable material bearing solution, and densifying said particles by calcination.

2. The process according to claim 1 wherein the fertile nuclear material is selected from a group consisting of thoria and urania, and the fissionable material is selected from the group consisting of a solution of uranium and a solution of plutonium.

3. The process according to claim 2 wherein the steps of passing are carried out substantially without commingling of said gel particles.

4. The process according to claim 3 wherein the steps of passing are carried out by passing said gel particles downwardly through a multi-stage liquid column, the upper portion of which contains said first fluid and the lower portion of which contains said second fluid, and all of the fluids in said column are immiscible.

5. The process according to claim 4 wherein the gel particles are formed as spheroidal shaped particles.

6. The process according to claim 5 wherein the first fluid contains a predetermined concentration of fissionable material, and the height of said first fluid in said column is predetermined to control the uptake of fissionable material in said gel particles during precalculated descent of said gel particles through said column.

7. The process according to claim 6 wherein said first fluid is an aqueous solution of fissionable material.

8. The process according to claim 7 wherein said second fluid is a dehydrating solvent for absorbing water from the impregnated gel particles to prevent adhesions among said gel particles.

9. The process according to claim 8 wherein the gel particles pass through a restricted portion of said column in passing directly from said first fluid into said second fluid to minimize the contact between said first and second fluids and the rate of extraction of water from said first fluid by said second fluid.

10. The process according to claim 7 wherein said second fluid is nonreactive with and has a density greater than said first fluid, and said gel particles pass from said second fluid into a third fluid, said third fluid being a dehydrating solvent nonreactive with said second fluid and having a density greater than said second fluid.

11. The process according to claim 7 wherein the fertile material is thoria, the aqueous solution of fissionable material is uranyl nitrate.

12. The process according to claim 7 wherein the fertile material is urania and the aqueous solution of fissionable material is uranyl nitrate.

13. The process according to claim 7 wherein the fertile material is urania and the aqueous solution of fissionable material is plutonyl nitrate.

No references cited.

CARL D. QUARFORTH, *Primary Examiner.*
BENJAMIN R. PADGETT, *Examiner.*
S. J. LECHERT, JR., *Assistant Examiner.*